United States Patent
Li et al.

(10) Patent No.: US 10,174,937 B2
(45) Date of Patent: Jan. 8, 2019

(54) METHOD FOR DISTRIBUTING GAS FOR OXY-FUEL COMBUSTION IN CIRCULATING FLUIDIZED BED

(71) Applicant: Institute of Engineering Thermophysics, Chinese Academy of Sciences, Beijing (CN)

(72) Inventors: Shiyuan Li, Beijing (CN); Jingzhang Liu, Beijing (CN); Qiangqiang Ren, Beijing (CN); Ming Gao, Beijing (CN); Qinggang Lv, Beijing (CN); Jianguo Zhu, Beijing (CN); Wei Li, Beijing (CN); Haoyu Li, Beijing (CN); Yongjie Na, Beijing (CN); Shaolin Bao, Beijing (CN)

(73) Assignee: Institute of Engineering Thermophysics, Chinese Academy of Sciences, Beijing (CN)

( * ) Notice: Subject to any disclaimer, the term of this patent is extended or adjusted under 35 U.S.C. 154(b) by 29 days.

(21) Appl. No.: 14/916,865

(22) PCT Filed: Nov. 6, 2014

(86) PCT No.: PCT/CN2014/090467
§ 371 (c)(1),
(2) Date: Mar. 4, 2016

(87) PCT Pub. No.: WO2015/032366
PCT Pub. Date: Mar. 12, 2015

(65) Prior Publication Data
US 2016/0201898 A1 Jul. 14, 2016

(30) Foreign Application Priority Data
Sep. 6, 2013 (CN) .......................... 2013 1 0403707

(51) Int. Cl.
*F23C 10/10* (2006.01)
*F23C 10/20* (2006.01)
(Continued)

(52) U.S. Cl.
CPC .............. *F23C 10/20* (2013.01); *F23C 6/045* (2013.01); *F23C 10/10* (2013.01); *F23C 10/18* (2013.01);
(Continued)

(58) Field of Classification Search
CPC ............ F23C 10/10; F23L 2900/07001; F23L 2900/07005; F23L 7/007; F23L 9/00
See application file for complete search history.

(56) References Cited

U.S. PATENT DOCUMENTS

| 4,165,717 A | 8/1979 | Reh et al. |
| 4,462,341 A * | 7/1984 | Strohmeyer, Jr. ....... F23C 10/02 110/263 |

(Continued)

FOREIGN PATENT DOCUMENTS

| CN | 1959208 | 5/2007 |
| CN | 101097060 | 1/2008 |

(Continued)

OTHER PUBLICATIONS

Machine Translation of CN1959208A, retrieved Dec. 31, 2017.*
(Continued)

*Primary Examiner* — Kenneth Rinehart
*Assistant Examiner* — Deepak Deean
(74) *Attorney, Agent, or Firm* — Barnes & Thornburg LLP

(57) ABSTRACT

The present disclosure provides a method for distributing gas for oxy-fuel combustion on a circulating fluidized bed. In the method, the gas is provided by three stages into a furnace of the circulating fluidized bed. The method
(Continued)

includes: blowing in a first-stage gas containing oxygen and recycled flue gas from the bottom of the furnace; blowing in a second-stage gas containing recycled flue gas from a transition zone between a dense-phase zone and a dilute-phase zone of the furnace; and blowing in a third-stage gas containing oxygen from a side wall of the furnace.

9 Claims, 4 Drawing Sheets

(51) Int. Cl.
    *F23L 7/00*         (2006.01)
    *F23C 10/18*      (2006.01)
    *F23L 9/00*         (2006.01)
    *F23C 6/04*       (2006.01)

(52) U.S. Cl.
    CPC ............... *F23L 7/007* (2013.01); *F23L 9/00* (2013.01); *F23L 2900/07001* (2013.01); *F23L 2900/07005* (2013.01); *Y02E 20/322* (2013.01); *Y02E 20/344* (2013.01)

(56) References Cited

U.S. PATENT DOCUMENTS

| | | | | |
|---|---|---|---|---|
| 6,505,567 | B1* | 1/2003 | Anderson | F02C 3/34 |
| | | | | 110/243 |
| 2007/0175411 | A1* | 8/2007 | Morin | F23C 10/04 |
| | | | | 122/4 D |
| 2011/0000406 | A1 | 1/2011 | Eriksson et al. | |
| 2012/0024206 | A1 | 2/2012 | Varonen | |
| 2012/0145052 | A1* | 6/2012 | Levasseur | F23C 5/12 |
| | | | | 110/341 |
| 2013/0284121 | A1* | 10/2013 | Kuivalainen | F23C 10/002 |
| | | | | 122/406.1 |

FOREIGN PATENT DOCUMENTS

| | | |
|---|---|---|
| CN | 102384469 | 3/2012 |
| CN | 102425789 | 4/2012 |
| CN | 202303356 | 7/2012 |
| CN | 102927563 | 2/2013 |
| CN | 102978409 | 3/2013 |
| CN | 103471093 | 12/2013 |
| EP | 1448876 | 8/2004 |
| JP | 59-109706 | 6/1984 |
| JP | 03-084302 | 4/1991 |
| WO | WO 01/73343 | 10/2001 |

OTHER PUBLICATIONS

Supplemental Partial European Search Report for related European Application No. 14842678.6 dated Apr. 11, 2017.
International Search Report for related International Patent Application No. PCT/CN2014/090467, dated Jan. 21, 2015 (Search Report is in English).
Translation of the Written Opinion of the International Searching Authority for related International Patent Application No. PCT/CN2014/090467, dated Jan. 21, 2015.
Yang Dong, et al., "An Analysis of the Residence Time of Anthracite Fine Particles in a 300MW Circulating Fluidized Bed Boiler," Journal of Engineering for Thermal Energy and Power, vol. 25, No. 3, May 2010, with English translation.
First Office Action dated Apr. 22, 2015 issued by the SIPO of China for parallel Chinese Patent Application No. 201310403707.2 with English translation.

* cited by examiner

METHOD FOR DISTRIBUTING GAS FOR OXY-FUEL COMBUSTION IN CIRCULATING FLUIDIZED BED

CROSS-REFERENCE TO RELATED APPLICATIONS

This application is a U.S. national phase application of PCT Application No. PCT/CN2014/090467, filed on Nov. 6, 2014, entitled "Method for Distributing Gas for Oxy-Fuel Combustion in Circulating Fluidized Bed," which claims priority to Chinese Application No. 201310403707.2, filed Sep. 6, 2013, both of which are incorporated herein by reference in their entireties.

FIELD OF THE INVENTION

The present disclosure relates to a field of circulating fluidized bed combustion, in particular to a method for distributing gas for oxy-fuel combustion in a circulating fluidized bed.

DESCRIPTION OF THE RELATED ART

With the sustaining development of global economy, energy consumption is increasing, and environmental pollution along with increasing greenhouse gas emission is more and more serious due to fossil fuel combustion, thereby accelerating environmental degradation. Obviously, global warming has seriously adversely affected humans in various aspects. An effective control for carbon emission has become a common goal for humans to be achieved. There are three technical routes to reduce carbon emission during coal-fired power generation, pre-combustion carbon capture, oxy-fuel combustion, and post-combustion carbon capture, in which the oxy-fuel combustion technique refers to feeding high purity oxygen and some recycled flue gas into a furnace to replace air in conventional combustion. In absence of nitrogen implantation, $CO_2$ is of a relatively high level in the flue gas after combustion, thereby achieving $CO_2$ enrichment in the combustion process. The technique of oxy-fuel combustion on the circulating fluidized bed effectively enables an efficient combustion of low volatile poor quality coal, a biomass combustion and an incineration of waste, such as rubbish, with a relatively low pollutant emission and a relatively simply pollutant emission control.

Since the circulating fluidized bed combustion achieves heat transfer of the furnace by means of turbulent flow and circulating flow of a large number of inert bed materials, without using any burners, there is no requirement for reconstruction and design on oxy-fuel burners. In addition, since the circulating fluidized bed boiler may expand heating surface thereof by means of an external heat exchanger, it has a significant advantage in combustion in high oxygen concentration. In contrast to oxy-fuel combustion in a pulverized coal furnace, the circulating fluidized bed combustion more easily achieves combustion in a high volume ratio of oxygen (50% and above). The technique of oxy-fuel combustion on the circulating fluidized bed boiler in high oxygen concentration has the following advantages: (1) the volume of the furnace is substantially decreased, thereby solving problems due to a relatively large cross-section of the furnace, such as a non-uniform fluidization, turning bed coking, and so on; (2) the amount of the flue gas in the overall boiler is reduced, the area of a convection heating surface in the tail of the boiler is reduced, and the amount of the flue gas needed to be purified, compressed and sequestrated is reduced, thereby simplifying and reducing technical impediment and cost; (3) the amount of the recycled flue gas is reduced, the heat dissipation loss of the system is reduced, thereby reducing the cost of a flue gas recycle system; (4) the volume of the boiler body and auxiliary machines is reduced, the metal consumption is reduced, thereby significantly reducing running cost of the boiler, and reducing the footprint area of the boiler island.

When the oxy-fuel combustion on the circulating fluidized bed in high oxygen concentration is implemented, it is necessary to inject high concentration oxygen and recycled flue gas. However, key technical problems needed to be emphatically solved are how the high purity oxygen and the preheated recycled flue gas are mixed, transported, injected into the furnace. Even though most of fly ash of the recycled flue gas is removed via a dust collector, there are fine particles, most of which have particle size less than 0.5 μm. Since such fine particles contain combustible substance, it easily leads to a deflagration of combustible dusts in a tunnel, and therefore security incidents, when the high purity oxygen and the preheated recycled flue gas are mixed and transported, especially when the oxygen concentration after mixing reaches up to 50% or more.

SUMMARY OF THE INVENTION (I) Technical Problem to be Solved

In view of the above-mentioned technical problems, the present disclosure provides a method for distributing gas for oxy-fuel combustion on a circulating fluidized bed, so as to ensure safety during mixing and transporting the high concentration oxygen and the recycled flue gas in the oxy-fuel combustion on the circulating fluidized bed.

(II) Technical Solution

According to one aspect of the present disclosure, there is provided a method for distributing gas for oxy-fuel combustion on a circulating fluidized bed. In the method, the gas is provided by three stages into a furnace of the circulating fluidized bed, the method includes: blowing in a first-stage gas containing oxygen and recycled flue gas from the bottom of the furnace; blowing in a second-stage gas containing recycled flue gas from a transition zone between a dense-phase zone and a dilute-phase zone of the furnace; and blowing in a third-stage gas containing oxygen from a side wall of the furnace.

(III) Advantageous Effect

It can be seen from the above technical solution that the present disclosure realizes stable combustion inside the furnace of the circulating fluidized bed in high oxygen concentration, thus avoiding the problem of localized high temperature caused by the high oxygen concentration, and solving the safety problem of transporting a mixture of oxygen and recycled flue gas having high oxygen concentration.

DESCRIPTION ON REFERENCE NUMERALS OF CRITICAL ELEMENTS OF THE PRESENT DISCLOSURE

Figure 1:
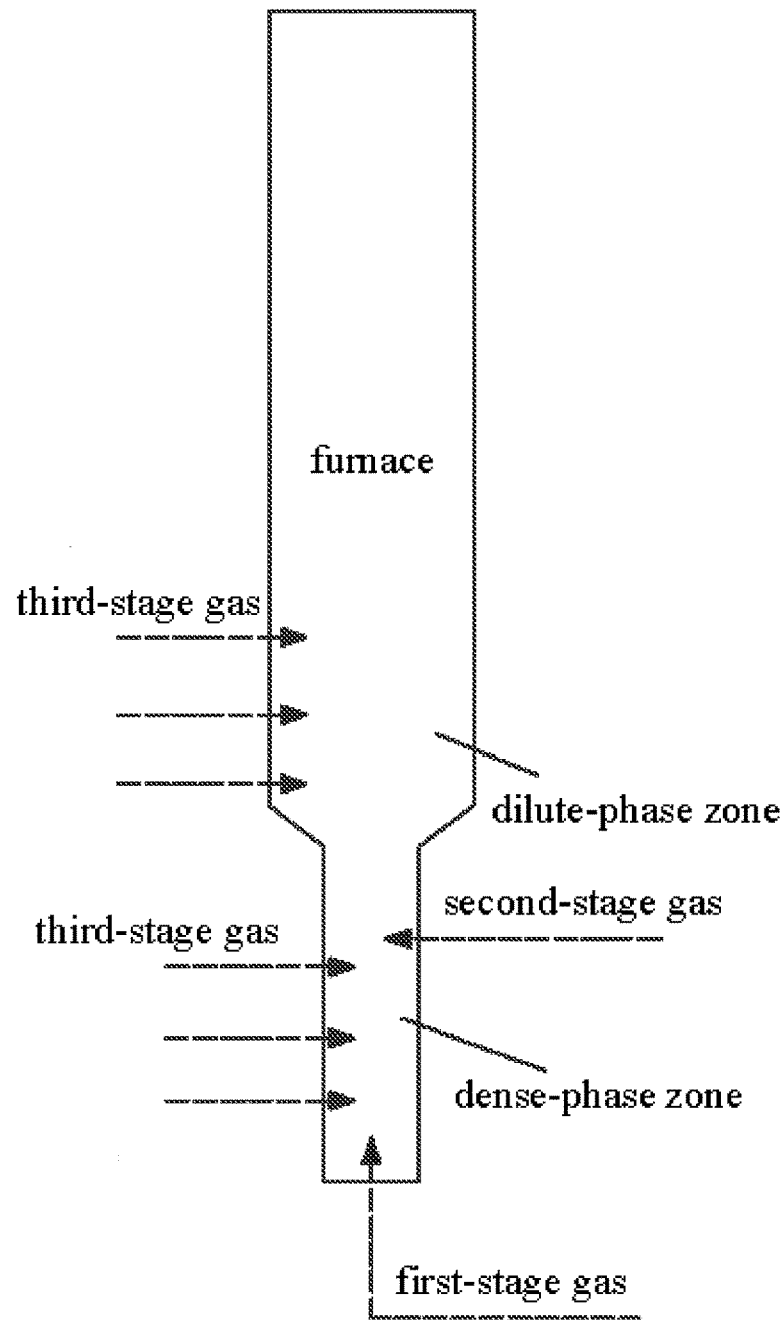
FIG. 1 is a schematic view of a method for distributing gas for oxy-fuel combustion on a circulating fluidized bed according to the present disclosure.

A—first-state gas; B—second-state gas; C—third-stage gas;
1—furnace; 2—cyclone; 3—loop seal;
4—external heat exchanger; 5—superheater; 6—economizer;
7—recycled flue gas preheater; 8—bag filter;
9—gas compression and purification system; 10—flue gas condenser;
11—recycle flue gas blower; 12—air separation unit;
13—control valve.

DETAILED DESCRIPTION OF PREFERRED EMBODIMENTS OF THE INVENTION

In order to more clearly understand the purposes, technical solutions and advantages of the present disclosure, the present disclosure will be further described in detail below in conjunction with specific embodiments, and with reference to accompanying drawings. It should be noted that, the same reference numbers are used for similar or identical parts in the drawings or description on the specification. As for the implementations which is not shown or illustrated in the drawings, they are well known to the ordinary skill in the art. In addition, although the present disclosure may provide an example including a particular value of parameter, it should be appreciated that it is unnecessary for the parameter to be exactly equal to the corresponding value, instead, it may approximate to the corresponding value within an acceptable error margin or design constraint. The words of direction mentioned in the embodiments, such as "upper", "lower", "front", "rear", "left" and "right", etc., refers to the directions with reference to the drawings. Thus, the words of direction used are intended to be illustrative and are not intended to limit the scope of the present disclosure.

The present disclosure provides a method for distributing gas for oxy-fuel combustion on a circulating fluidized bed. Referring to FIG. 1, in the method for distributing gas, the gas is provided by three stages into a furnace of the circulating fluidized bed, specifically, blowing in a first-stage gas containing oxygen and recycled flue gas from the bottom of the furnace; blowing in a second-stage gas containing recycled flue gas from a transition zone between a dense-phase zone and a dilute-phase zone of the furnace; and blowing in a third-stage gas containing oxygen from a side wall of the furnace. The first-stage gas is in a range of 65-75% of total gas flow in the furnace; the second-stage gas is in a range of 5-10% of the total gas flow in the furnace; and the third-stage gas is in a range of 20-30% of the total gas flow in the furnace.

Preferably, in the method for distributing gas for oxy-fuel combustion on the circulating fluidized bed according to the present disclosure, a volume ratio of the oxygen in the first-stage gas is in a range of 25-35%.

Preferably, in the method for distributing gas for oxy-fuel combustion on the circulating fluidized bed according to the present disclosure, the second-stage gas is blown in via a refeeding tube, and the second-stage gas further contains oxygen, a volume ratio of which in the second-stage gas is N, where $0<N\leq 35\%$. The refeeding tube is a refeeding tube connecting a loop seal of the circulating fluidized bed with the furnace, or a refeeding tube connecting an external heat exchanger of the circulating fluidized bed with the furnace.

Preferably, in the method for distributing gas for oxy-fuel combustion on the circulating fluidized bed according to the present disclosure, the third-stage gas is blown into the furnace from a side wall of the dilute-phase zone of the furnace in 3-5 layers at different heights; if necessary, a part of the third-stage gas is blown into the dense-phase zone of the furnace in 3-5 layers.

In the method for distributing gas according to the present disclosure, the volume ratio of oxygen in the first-stage gas and the second-stage gas is relatively lower, the transportation of the oxygen mixed with the recycled flue gas is relatively safe, and the third-stage gas is pure oxygen without ash-laden gas mixed, there are no safety issues for the transportation, thereby eliminating safety hazards.

In addition, by means of properly distributing ratio of each stage gas distribution to the three-stage gas distribution according to the present disclosure, total volume ratio of oxygen to the total gas flow of the furnace of the circulating fluidized bed reaches up to 50% or more, and it enables fuel in the dense-phase zone of the furnace to combust in relatively low oxygen concentration, and heat-transfer characteristics and combustion control approximate air combustion condition. When unburned volatile component and fixed carbon reach to the dilute-phase zone, the fuel is burned off by means of using cooperatively the second-stage gas and the third-stage gas, and uniform combustion temperature is ensured. Therefore, the method for distributing gas according to the present disclosure realizes stable combustion inside the furnace of the circulating fluidized bed in high oxygen concentration, thus avoiding the problem of localized high temperature caused by the high oxygen concentration.

In the first exemplary embodiment of the present invention, there is provided a method for distributing gas for oxy-fuel combustion on a circulating fluidized bed, the method for distributing gas is based on a system consisting of a combustion device body on circulating fluidized bed, a flue gas recycling system, and the like. The combustion device body on circulating fluidized bed comprises a furnace, a cyclone, a loop seal and an external heat exchanger, which are sequentially connected with one another.

Figure 2:
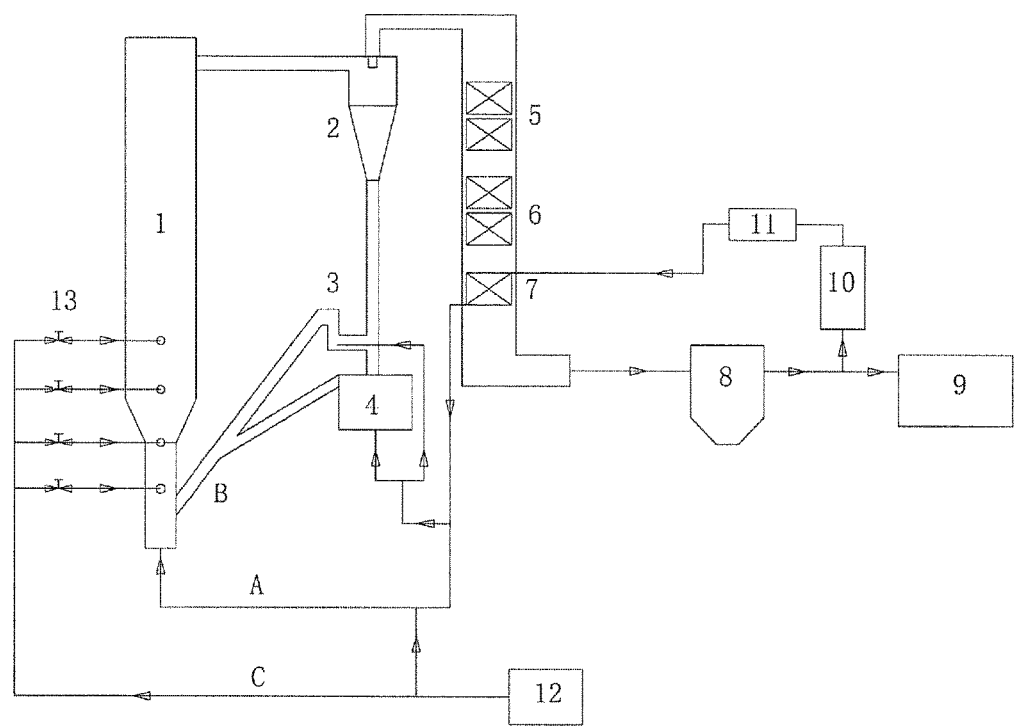
FIG. 2 is a schematic view of a method for distributing gas for oxy-fuel combustion on a circulating fluidized bed according to a first embodiment of the present invention.

Referring to FIG. 2, the flue gas generated during the combustion with finer particles enter into the cyclone through the upper portion of the furnace, the materials separated by the cyclone enter into the loop seal and the external heat exchanger, and return back to the furnace via a refeeding tube, most of fluidizing gas in the loop seal and in the external heat exchanger would enter into the furnace via the loop seal (a small amount of fluidizing gas in the loop seal may reversely enter into a cyclone separator and be exhausted along with the flue gas without entering into the refeeding tube). The hot flue gas exhausted from an exhaust pipe of the cyclone separator enters into a rear gas pass, passes through a superheater, an economizer, a recycled flue gas preheater, which are positioned in the rear gas pass, then enters into a bag filter. After dust-collecting of the flue gas, one portion of the flue gas enters into the flue gas recycling system consisting of a condenser, a recycle flue gas blower, and the recycled flue gas preheater, the portion of the flue gas is dehydrated via the condenser, compressed via the flue gas recycling blower, then preheated by the recycled flue gas preheater, so as to form dry flue gas with a relatively high temperature for acting as the recycled flue gas. The other portion of the flue gas is blown into a gas compression and purification system, and processed by subsequent processes comprising dehydration, purification, compression, etc., the resulted high concentration of carbon dioxide is used for materials for chemical products, petroleum tertiary recovery or geological buried layer, or the like, or exhausted directly.

The oxy-fuel combustion system on the circulating fluidized bed shown in FIG. 2 provides gas flow for the furnace in three stages: gas mixture mixed by high purity oxygen and the recycled flue gas as a first-stage gas A is blown in from the bottom of the furnace 1, for dense-phase zone combustion, the first-stage gas A is in a range of 65-75% of total gas flow, a volume ratio of the oxygen in the first-stage gas A is in a range of 25-35%. A second-stage gas B consisting of the fluidizing gas in the external heat exchanger 4 and the fluidizing gas in the loop seal 3 is blown into a transition zone between a dense-phase zone and a dilute-phase zone of the furnace 1 via the refeeding tube, the second-stage gas B is in a range of 5-10% of the total gas flow, and all the second-stage gas B is the recycled flue gas. A third-stage gas C is blown into the dilute-phase zone and the dense-phase zone of the furnace in 3-5 layers from a side wall of the furnace at different heights, a channel in each layer is controlled by a valve 13, which may adjust and close the gas flow of the plurality of channels, the third-stage gas is in a range of 20-30% of the total gas flow, the third-stage gas directly employs oxygen generated by an air separation unit. The third-stage gas C is mainly blown into the dilute-phase zone via a gas inlet, the height of which is not less than the height of an opening (refeeding inlet) of the refeeding tube on the side wall of the furnace. In the case that the oxygen concentration of the dense-phase zone is relatively low or the temperature of the dense-phase zone is relatively low, a gas inlet which is lower than the height of the refeeding inlet may be used to inject the third-stage gas into the dense-phase zone of the furnace.

The flue gas generated by the combustion of the fuel in the furnace 1 along with the recycled materials enters into the cyclone separator 2, one portion of the materials separated enter into the loop seal 3 and the other portion enter into the external heat exchanger 4, and the materials which pass through the loop seal 3 and the external heat exchanger 4 enter into the furnace 1 via the refeeding tube. The flue gas entraining dust at an outlet of the cyclone separator 2 enters into the rear gas pass of the boiler, successively passes through the superheater 5, the economizer 6, the recycled flue gas preheater 7, then enters into the bag-type dust collector 8. After dust-collecting of the flue gas, one portion of the flue gas is dehydrated via the condenser 10, compressed via the recycle flue gas blower 11, then preheated by the recycled flue gas preheater 7, so as to form dry flue gas with a relatively high temperature. One portion of the dry flue gas is blown into the external heat exchanger 4 and the loop seal 3 for acting as the fluidizing gas, the other portion of the recycled dry flue gas and the high purity of oxygen separated by the air separation unit 12 are mixed to be blown into the furnace 1 as the first-stage gas A.

As for the high purity of oxygen separated by the air separation unit 12, one portion is mixed with the recycled dry flue gas to be blown into the bottom of the furnace 1 as the first-stage gas A, the other portion of the high purity of oxygen is injected into the furnace 1 via the 3-5 layers as the third-stage gas C, such an injection via a plurality of layers may be adjusted by the control valve 13, choosing the desired channel of the layers to blow in the third-stage gas C.

The other portion of the flue gas via the bag-type dust collector 8 is blown into the gas compression and purification system 9, and processed by subsequent processes comprising dehydration, purification, compression, etc., the resulted high concentration of carbon dioxide is used for materials for chemical products, petroleum tertiary recovery or geological buried layer.

Optionally, the oxy-fuel combustion device on the circulating fluidized bed may not have the external heat exchanger 4, thus the second-stage gas only contains the fluidizing gas in the loop seal 3, which enters into the furnace via the refeeding tube.

Thus, the method for distributing gas for oxy-fuel combustion on the circulating fluidized bed according to the present embodiment has been described completely.

Figure 3:
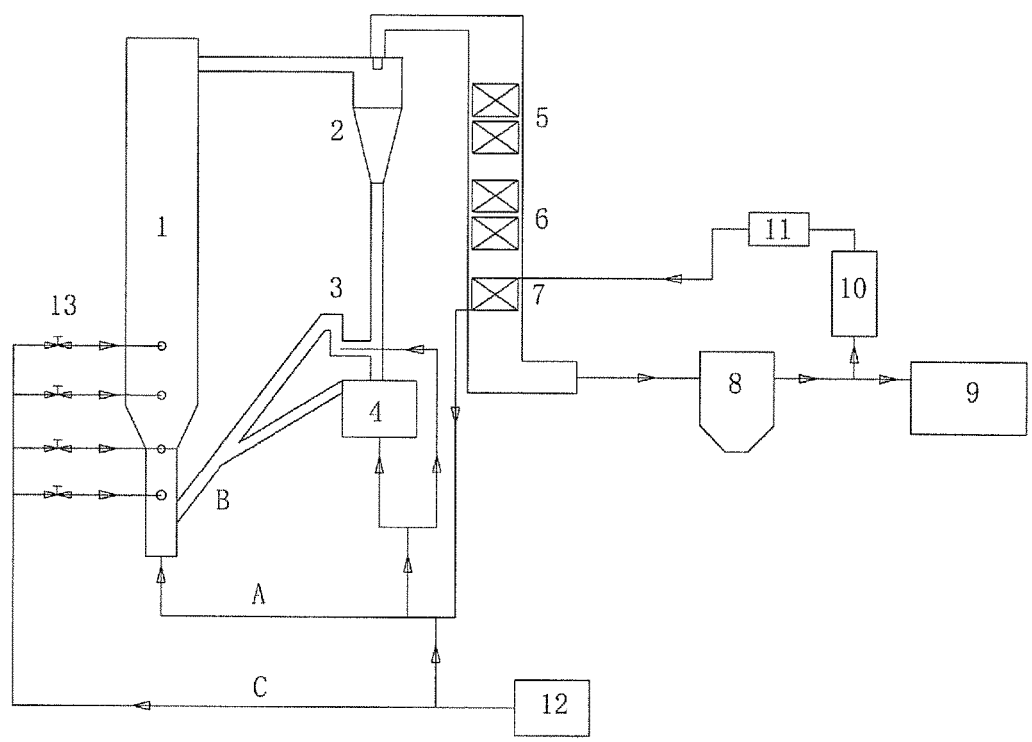
FIG. 3 is a schematic view of a method for distributing gas for oxy-fuel combustion on a circulating fluidized bed according to a second embodiment of the present invention.

In the second exemplary embodiment of the present invention, there is further provided another method for distributing gas for oxy-fuel combustion on a circulating fluidized bed. As shown in FIG. 3, in the method for distributing gas for oxy-fuel combustion on the circulating fluidized bed according to the present embodiment, recycled flue gas from a flue gas recycling system and oxygen from an air separation unit are mixed to form gas mixture, in which a volume ratio of oxygen is 25-35%, one portion of the gas mixture acts as a first-stage gas A to be blown into a furnace 1, and the other portion is blown into an external heat exchanger 4 and a loop seal 3 to act as fluidizing gas, and then enters into the furnace 1 via a refeeding tube to act as a second-stage gas B. The method further employs a third-stage gas consisting of oxygen.

In the method for distributing gas for oxy-fuel combustion on the circulating fluidized bed according to the present embodiment, the ratio of the three stages gas to total gas flow may be chosen from the following range: the first-stage gas:the second-stage gas:the third-stage gas=(65~75%): (5~10%):(20~30%).

Thus, the method for distributing gas for oxy-fuel combustion on the circulating fluidized bed according to the present embodiment has been described completely.

Figure 4:
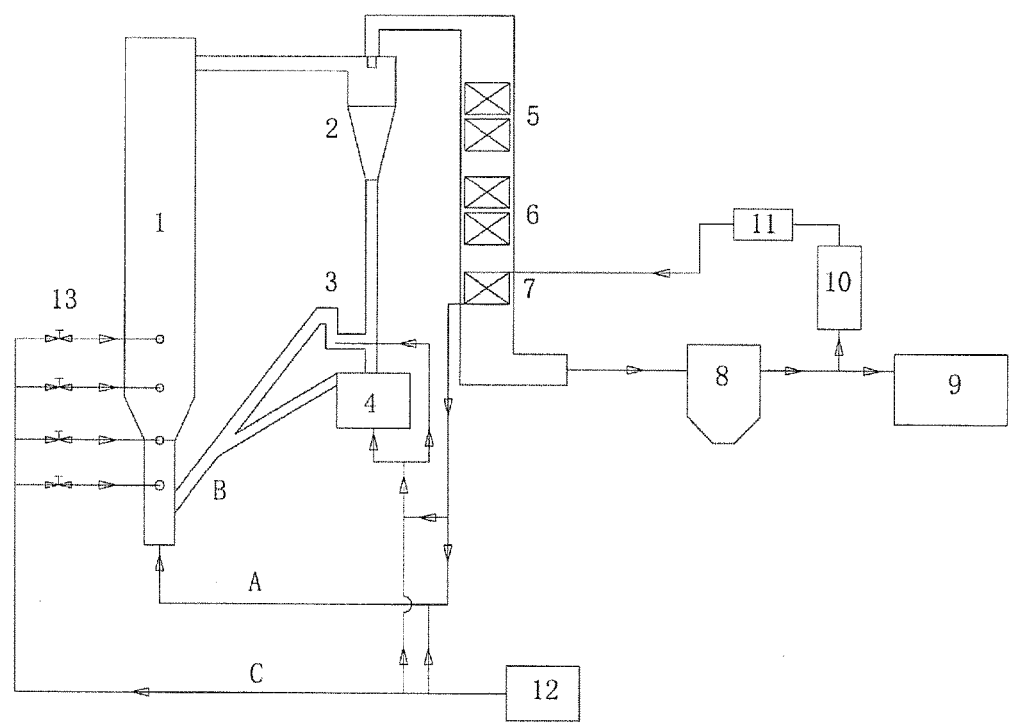
FIG. 4 is a schematic view of a method for distributing gas for oxy-fuel combustion on a circulating fluidized bed according to a third embodiment of the present invention.

In the third exemplary embodiment of the present invention, there is further provided another method for distributing gas for oxy-fuel combustion on a circulating fluidized bed. As shown in FIG. 4, as for high purity of oxygen generated by an air separation unit 12, one portion is mixed with recycled flue gas to form gas mixture, in which a volume ratio of oxygen is 25-35%, to be blown into the furnace from the bottom of the furnace 1 as a first-stage gas A. Another portion of the high purity of oxygen is mixed with the recycled flue gas to form a gas mixture, in which a volume ratio of oxygen is N, where $0<N\leq 35\%$, to act as fluidizing gas of an external heat exchanger 4 and a loop seal 3, and then enters into the furnace 1 via a refeeding tube as a second-stage gas. A further portion of the high purity of oxygen is injected into the furnace 1 in 3-5 layers as a third-stage gas C.

In the method for distributing gas for oxy-fuel combustion on the circulating fluidized bed according to the present embodiment, the ratio of the three stages gas to total gas flow may be chosen from the following range: the first-stage gas:the second-stage gas:the third-stage gas=(65~75%): (5~10%):(20~30%).

Thus, the method for distributing gas for oxy-fuel combustion on the circulating fluidized bed according to the present embodiment has been described completely.

In summary, the three embodiments of the present invention have been described in detail with respect to the accompanying figures. On the basis of the above description, the method for distributing gas for oxy-fuel combustion on the circulating fluidized bed according to the present disclosure should be apparent to the ordinary skill in the art.

Furthermore, definitions on the various elements and methods are not limited to the detailed structures, shapes or manners mentioned in the embodiments of the present invention, but they may be simply replaced with well-known replacements by one of ordinary skill in the art.

In conclusion, the present invention provides a method for distributing gas for oxy-fuel combustion on a circulating fluidized bed, which is suitable for oxy-fuel combustion on a circulating fluidized bed using coal, biomass and other carbon-containing fuels, especially for oxy-fuel combustion in high oxygen concentration. The method realizes stable combustion inside the furnace of the circulating fluidized bed in high oxygen concentration, thus avoiding the problem of localized high temperature caused by the high oxygen concentration, and solving the safety problem of transporting a mixture of oxygen and recycled flue gas having high oxygen concentration.

The purposes, technical solutions and advantageous effects of the present disclosure have been described in further detail in the above specific embodiments. It is to be understood that the foregoing description is only specific embodiments of the present invention, and is not intended to limit the present disclosure, accordingly, any modifications, equivalent replacements, improvements and the like within the spirit and principle of the present disclosure are intended to be included within the scope of the present invention.

What is claimed is:

1. A method for distributing gas for oxy-fuel combustion on a circulating fluidized bed, wherein the gas is provided by three stages into a furnace of the circulating fluidized bed, the method comprising the steps of:
   blowing in a first-stage gas containing oxygen and recycled flue gas from the bottom of the furnace;
   blowing in a second-stage gas containing recycled flue gas from a transition zone between a dense-phase zone and a dilute-phase zone of the furnace; and
   blowing in a third-stage gas containing oxygen from a side wall of the furnace in layers,
   wherein a volume ratio of the oxygen in the first-stage gas is in a range of 25-35%,
   wherein the second-stage gas further contains oxygen, and a volume ratio of the oxygen in the second-stage gas is N, where 0<N≤35%, and,
   wherein the first-stage gas is in a range of 65-75% of total gas flow in the furnace, the second-stage gas is in a range of 5-10% of the total gas flow in the furnace, and the third-stage gas is in a range of 20-30% of the total gas flow in the furnace.

2. The method for distributing gas according to claim 1, wherein the second-stage gas is blown in via a refeeding tube.

3. The method for distributing gas according to claim 2, wherein the refeeding tube is a refeeding tube connecting a loop seal of the circulating fluidized bed with the furnace.

4. The method for distributing gas according to claim 2, wherein the refeeding tube is a refeeding tube connecting an external heat exchanger of the circulating fluidized bed with the furnace.

5. The method for distributing gas according to claim 1, wherein the third-stage gas is blown in from a side wall of the dilute-phase zone of the furnace.

6. The method for distributing gas according to claim 5, wherein the third-stage gas blown in from the side wall of the dilute-phase zone of the furnace is blown into the furnace in 3-5 layers along the height direction.

7. The method for distributing gas according to claim 5, wherein the third-stage gas is further blown in from a side wall of the dense-phase zone of the furnace.

8. The method for distributing gas according to claim 7, wherein the third-stage gas blown in from the side wall of the dense-phase zone of the furnace is blown into the furnace in 3-5 layers along the height direction.

9. The method for distributing gas according to claim 1, wherein first-stage gas is only inlet into the bottom of the furnace.

* * * * *